(12) United States Patent
Kauffmann

(10) Patent No.: US 11,479,134 B2
(45) Date of Patent: Oct. 25, 2022

(54) POP UP ELECTRICAL APPARATUS

(71) Applicant: Alan Kauffmann, Bothell, WA (US)

(72) Inventor: Alan Kauffmann, Bothell, WA (US)

(*) Notice: Subject to any disclaimer, the term of this patent is extended or adjusted under 35 U.S.C. 154(b) by 418 days.

(21) Appl. No.: 16/704,198

(22) Filed: Dec. 5, 2019

(65) Prior Publication Data
US 2020/0180456 A1 Jun. 11, 2020

Related U.S. Application Data

(60) Provisional application No. 62/777,136, filed on Dec. 8, 2018.

(51) Int. Cl.
*B60L 53/30* (2019.01)
*H01R 13/52* (2006.01)
*B60L 53/16* (2019.01)
*H01R 13/631* (2006.01)

(52) U.S. Cl.
CPC ............. *B60L 53/30* (2019.02); *B60L 53/16* (2019.02); *H01R 13/5213* (2013.01); *H01R 13/631* (2013.01); *H01R 2201/26* (2013.01)

(58) Field of Classification Search
CPC ................................ B60L 53/30; B60L 53/16
USPC ......................................................... 320/109
See application file for complete search history.

(56) References Cited

U.S. PATENT DOCUMENTS

| | | | |
|---|---|---|---|
| 5,654,621 A * | 8/1997 | Seelig | H02J 50/12 320/108 |
| 9,543,769 B2 | 1/2017 | Kauffmann | |
| 9,780,584 B2 | 10/2017 | Kauffmann | |
| 9,862,284 B2 | 1/2018 | Kauffmann | |
| 10,538,172 B2 | 1/2020 | Kauffmann | |
| 2013/0113425 A1* | 5/2013 | Kauffmann | H05K 5/069 320/109 |
| 2015/0306974 A1* | 10/2015 | Mardall | H01M 10/625 429/120 |
| 2016/0218497 A1* | 7/2016 | Kauffmann | H05K 5/069 |
| 2017/0291498 A1* | 10/2017 | Gerfast | H02J 7/0027 |
| 2018/0272885 A1* | 9/2018 | Halker | B60L 53/665 |
| 2018/0339597 A1* | 11/2018 | Kruszelnicki | B60L 53/305 |
| 2019/0009680 A1* | 1/2019 | Kauffmann | B60L 53/126 |
| 2019/0255959 A1* | 8/2019 | Ruppert | B60L 58/22 |
| 2021/0086633 A1* | 3/2021 | Kupfer | H01R 24/86 |
| 2021/0276440 A1* | 9/2021 | Ewald | H02J 7/00304 |
| 2022/0016992 A1* | 1/2022 | Ugur | H02J 7/0045 |

FOREIGN PATENT DOCUMENTS

| | | |
|---|---|---|
| DE | 202009000259 U | 3/2009 |
| DE | 102008055881 A1 | 5/2010 |
| WO | WO2010060720 A2 | 6/2010 |

* cited by examiner

*Primary Examiner* — Suchin Parihar
(74) *Attorney, Agent, or Firm* — Emerson, Thomson & Bennett; Roger D. Emerson

(57) ABSTRACT

Provided in this disclosure is a charging apparatus for an electrical vehicle. When an electric vehicle is parked above the charging apparatus, a primary connector is slide-ably extended upwards and out of an enclosure in such a manner that it plugs into a secondary connector installed in the bottom of the chassis of the vehicle. The secondary connector includes an inverted cone-shaped component that is mounted to freely move horizontally in all directions from the center to engage the slide-ably extending portion of the primary connection and thereby achieve a final alignment of the primary and secondary connectors.

20 Claims, 3 Drawing Sheets

POP UP ELECTRICAL APPARATUS

This application claims the benefit of U.S. Provisional Application No. 62/777,136, entitled AN AUTOMATED UNIVERSAL POP UP APPARATUS, THAT WILL PLUG IN A PRIMARY CONNECTOR TO A SECONDARY CONNECTOR WHICH IS AFFIXED TO AN ELECTRIC VEHICLE, filed Dec. 8, 2018, which is fully incorporated herein by reference.

I. BACKGROUND

A. Technical Field

This invention pertains to the field of electrical connections between an electrical supply and an electric vehicle for the purpose of charging the electrical storage device of the vehicle.

B. Description of Related Art

An electrical supply for an electric vehicle is commonly known as a "charging station" or an EVSE (Electric Vehicle Service Equipment) that is mounted on a parking surface. The EVSE serves as the interface between the driver and the station. A cable is attached to the EVSE power supply and has a conductive connector attached to the other end which in turn is plugged into the connector that is installed on the side, rear, or front of an electric vehicle. This connector is typically manually plugged into the vehicle's connector by the driver.

It would be desirable to remove the driver from the task of plugging in a connector to an electric vehicle, which would facilitate acceptance of electric vehicles. With fully autonomous vehicles on the horizon, an autonomous charging station would also be required.

It is known to employ robots that plug in the connector from an electric power source to an electric vehicle. Such robots are typically similar to the robots on auto manufacturing plant assembly lines in that they twist, turn, tilt and push the connector into a receptacle at a suitable location on the side, front, and rear of a vehicle. These twists, turns, tilts, and pushes are controlled by sensors and cameras, connected to a computer so that a plug-in connection can be made. However, such increased complexity can result in increased equipment failure, maintenance cost, and initial purchase price. Such robots can be exposed to accidental damage, vandalism, theft, and malfunction, further contributing to cost It is known to employ a charging device with a plug-in connector extending from the ground to engage a charging port on the bottom of the vehicle. This type of device is relatively simple compared to an above ground robot but are known to be prone to certain concerns that has prevented them from gaining acceptance within the industry. Such concerns include protecting both the receiving connector and the supply connector from shorting out or damage associated with the underside of a vehicle, and the location of the supply connector being flush with the surface.

Moreover, below-ground charging devices require the vehicle to be parked precisely over the primary connector for the connection to be made, which was difficult and impractical. Such underground plug-in devices use linear rails and motors to move the primary connector horizontally in the X and Y axes within the ground enclosure to more precisely maneuver the primary connector into engagement with a secondary connector on the vehicle. Precise alignment between the primary and secondary connectors can be achievable, though this arrangement is difficult to seal the enclosure from moisture. Other such devices have used a tilting beam to raise the primary connector to engagement with the secondary connector on the vehicle. This tilting beam suffers from the same difficulties as the linear rails in that it is difficult to seal the enclosure and components against moisture.

In response to such concerns, induction charging has been considered an acceptable alternative for under-vehicle plug-in conductive connectors with similar levels of convenience. Induction is convenient since the vehicle only needs to be parked above a charging station for the vehicle to be charged. The charging coils on the vehicles underside and the coils installed in the surface of the ground are encased inside of a tough waterproof composite material providing protection from the elements. However, induction charging is not practical for commercial use. Induction charging is only approved for up to 11 KW at the present time and will never be capable of DC fast charging, and so several hours of charging are required to gain any significant driving range.

Heretofore, most electric vehicle charging is performed at home. But as electric vehicles become more and more the preferred vehicle on our roads there will be more and more need to charge a vehicle quickly at more locations, with multiple charging EVSE outlets available. However, there are similar concerns for an in-ground, flush-mounted charging station that plugs into the bottom of an electric vehicle as for commercial, above-ground charging stations with 20 foot cables with a connector on the end, since both types of EVSEs are exposed to the same environment. However, while such concerns cannot be addressed for the above-ground charging station, these concerns can be addressed by the in-ground installation of the present invention addresses.

II. SUMMARY

Provided in this disclosure is a charging station positioned below a horizontal surface, specifically a parking surface that hides and secures the EVSE, making it environmentally friendly and safe from damage caused accidentally or by vandalism. Instead of the connector being plugged in by the driver to the side, front, or rear of the vehicle, the present charging station robotically autonomously plugs in a primary connector from an enclosure below the ground to a secondary connector installed in the bottom of the vehicle. This design is compatible with existing technology as well as any technology that might be developed in the future. In this manner, the present charging station offers convenience of driving a vehicle over the top of the charging station where the station plugs in the connector automatically for the driver, at home as well as away from home.

The present invention provides an EVSE device that is installed underground with a top that is flush with the parking surface, so that a plug-in connector when not in use is secure underground inside a waterproof EVSE enclosure. When an electric vehicle is parked above the EVSE the primary connector is slide-ably extended upwards and out of the EVSE in such a manner that the connector remains protected from water and other contaminants and plugs into the secondary connector installed in the bottom of the chassis of the vehicle. The present system maintains a secure connection even if the vehicle were to move up or down on its suspension once plugged in.

The secondary connector works in conjunction with the primary connector of the EVSE that is in the ground. This secondary connector is installed in the bottom of the chassis of an electric vehicle. The secondary connector provides several essential functions necessary for a successful plugging in of the primary connector to the secondary connector.

The secondary connector includes a housing and substrate that mounts in the chassis of the vehicle having a bottom flush with the bottom surface of the chassis. Within the housing is an inverted cone shaped component that serves as a mounting surface for the secondary connector and is inserted in such a way that it floats freely within the substrate. The floating mount floats inside the substrate so that the inverted cone freely moves horizontally in all directions from the center to achieve a final alignment of the primary and secondary connectors. This floating mount can "clock" or rotate several degrees to the left or right of center to enable the secondary connector to receive a primary connector that is several inches off-center. In this way, the floating mount can accommodate a vehicle that is not perfectly aligned in a parking space.

The substrate also contains a pair of primary doors that seal out water and other contaminants protecting the connector. When these doors open, a blast of air exhausts out, blowing away any water and debris that may have accumulated around the opening at the bottom of the substrate. Also, at the bottom of the substrate there are fingers that are an additional barrier to prevent water intrusion into the mouth of the inverted cone 102 opening. These fingers are opened at the same time as the air is blasted out through the primary doors.

The primary EVSE is constructed from but not limited to common materials used for such enclosures and housings, such as stainless steel, steel, or aluminum, using common methods of manufacturing, such as forming, cutting, and welding. The preferred material of this present invention is carbon fiber, and other composite materials, or plastics that may be molded or printed.

The present invention operates in conjunction with existing methods of locating a charging station via GPS, Google Maps, or other locator systems that may be in use by various existing and future charging networks, such as Charge Point, Electrify America, EVgo, and others. These networks have their own methods of identifying, qualifying, and receiving payment as part of their services. These networks in the future will allow access to the charging station by direct wireless communication between the charging station and the vehicle, which is a further step toward autonomous charging of electric vehicles.

After the primary and secondary connectors are connected, communication is carried on through the wiring in the primary and secondary connectors using common protocols designated by the connector manufacturer and the charging network. The present invention is designed to protect, deploy, align, and maintain the plug-in connection of an in-ground, conductive primary connector to a secondary connector mounted to the bottom of an electric vehicle.

The present invention is designed to use existing station locator methods. There may at times be a need for a more precise locating system that will work with a vehicle driver or autonomous driving system to park the vehicle perfectly for plugging in the connector. Such a locator could work on the same principle used in metal detectors. The present system would interface with the steering, accelerator, and braking systems of the vehicle. The metal locators would be installed flush in the pavement of the parking area that would be detected by the present inventions guidance system, and commands would be sent to the various systems of the vehicle to guide the vehicle to the proper location and the vehicle would be parked.

According to an aspect of the invention, an improved, less complicated device is provided that protects, deploys, aligns, plugs in, and automatically maintains a connection between an electric vehicle and a power source, which is mounted flush with a parking surface.

According to another aspect of the invention, a reduced number of elements and a reduced number of steps are provided to plug in the connector to an electric vehicle.

According to yet another aspect of the invention, a system is provided that operates in any weather condition, including sun, rain, snow, and ice.

According to still another aspect of the invention, a system is provided that is easy to manufacture, install, and maintain.

According to a further aspect of the invention, a system is provided that meets the aforementioned objectives at a cost that is equal or less than all other devices.

Other benefits and advantages of this invention will become apparent to those skilled in the art to which it pertains upon reading and understanding of the following detailed specification.

III. BRIEF DESCRIPTION OF THE DRAWINGS

The disclosed charging system may take physical form in certain parts and arrangement of parts, embodiments of which will be described in detail in this specification and illustrated in the accompanying drawings which form a part hereof and wherein.

IV. DETAILED DESCRIPTION

Figure 1:
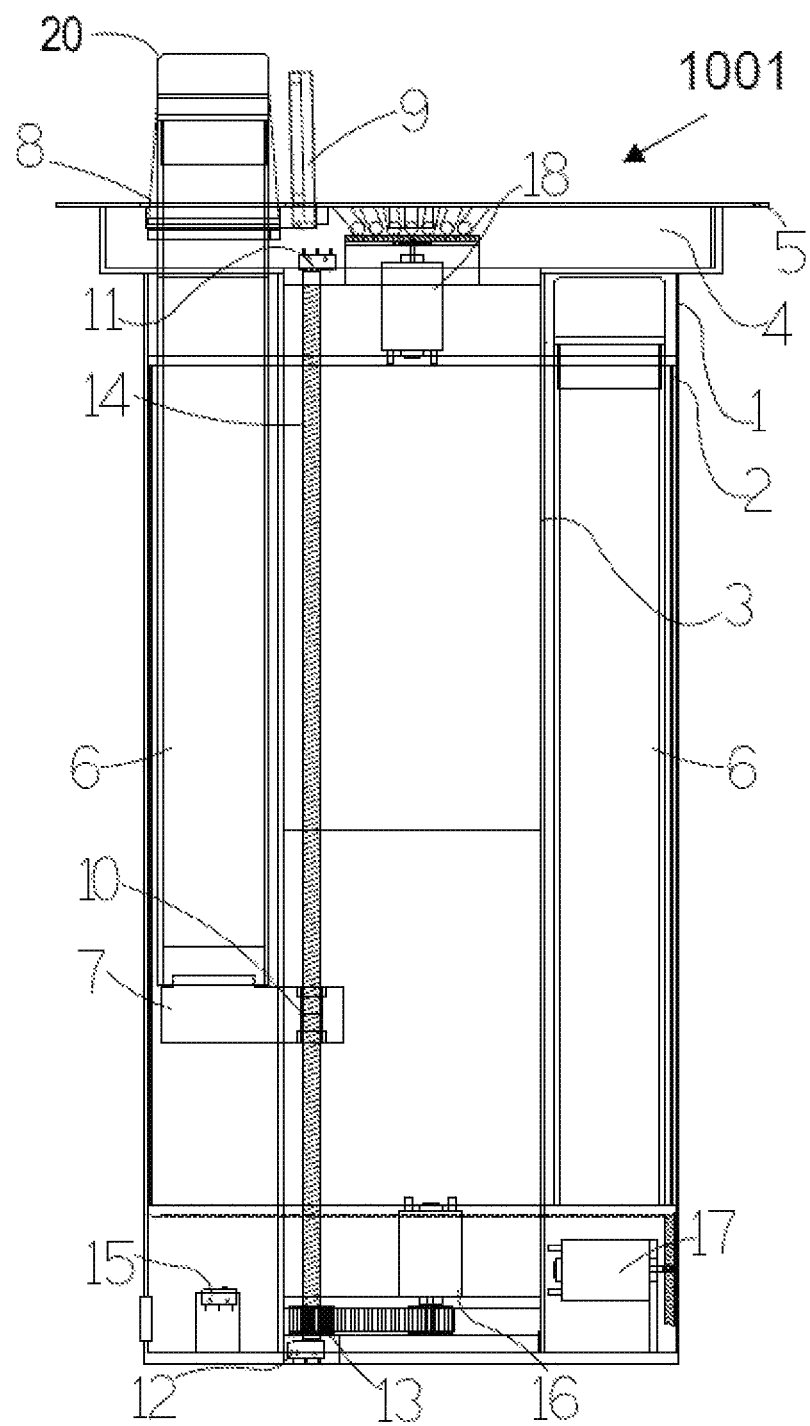
FIG. 1 is a side view of the primary connector of the present plug-in apparatus.

Referring now to the drawings wherein the showings are for purposes of illustrating embodiments of the article only and not for purposes of limiting the same, and wherein like reference numerals are understood to refer to like components:

The principal objective of the present invention is to provide a more convenient method and apparatus for charging an electric vehicle that is automated, simple, reliable and inexpensive. The present invention compensates for misalignment between the primary and secondary connectors and maintains sufficient force between the connectors to keep the connectors securely connected throughout a charge cycle, while removing the driver from the job of plugging in the connector. Construction of the present invention is accomplished by means of commonly used materials and methods used in construction of such devices.

Figure 2:
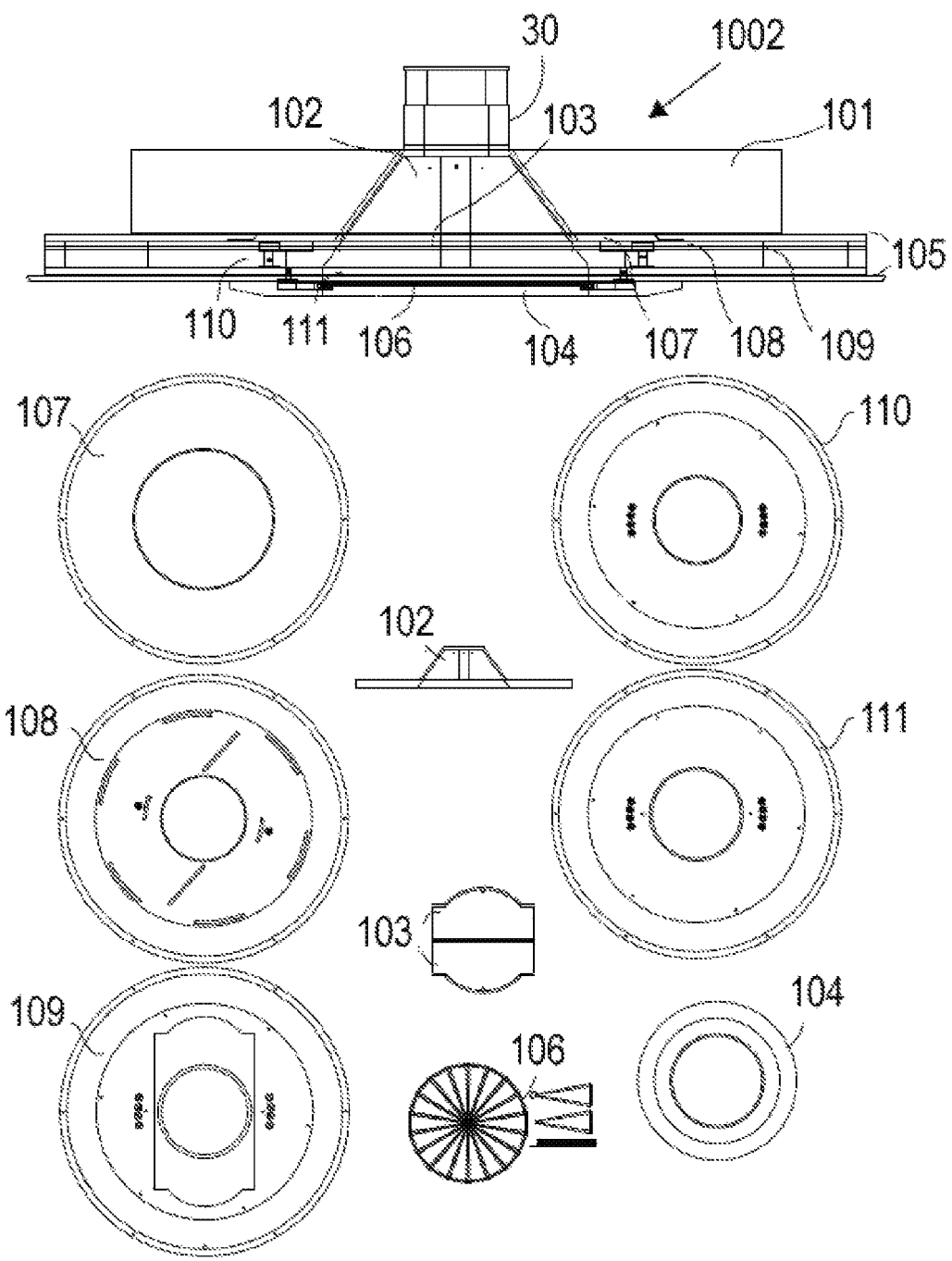
FIG. 2 is a side view of the secondary connector of the present plug-in apparatus, along with overhead views of the separate layers forming the substrate.

According to the present invention, an exemplary embodiment includes two principal assemblies: a primary connector 1001, as particularly shown in FIG. 1, and a secondary connector 1002, as particularly shown in FIG. 2.

With reference to the side view of FIG. 1, an exemplary embodiment of the present invention includes the primary connector 1001 with all its components and parts. In a preferred embodiment, the primary connector 1001 is installed underground at a charging station and has a top surface flush with the parking surface. The primary connector 1001 includes enclosure 1 that has at least one sidewall a closed bottom and an open top with a crown.

One or more towers 6 are received and retained within the enclosure 1. A tower 6 is an energy charging component having a specific type of electrical connector portion 20 affixed on the top end of the tower 6 for engaging with a suitably mated electrical charging port on a vehicle, as explained in detail herein below. Since various electrical vehicles can have different types of charging ports produced by different manufacturers, a plurality of different types of towers 6 can be employed in a single charging station, each tower 6 having suitable respective electrical connector portions 20 affixed on their respective top ends. The tower 6 is electrically connected to an electrical supply (not shown) which provides direct current (DC) or alternating current (AC) to the vehicle for electrical charging.

The enclosure 1 includes a magazine 2 that stores and positions a plurality of the various different towers 6 having various types of manufactured connector portions 20 affixed to the top of each tower 6. In one embodiment of the present invention, a single tower 6 can be implemented, and such an embodiment would not include the magazine 2 and its related components. A push/pull arm 7 is provided for raising and lowering the tower 6, as will be explained in detail herein below.

An air tank 3 is provided for supplying a blast of air, as will be explained herewith. The air tank 3 also serves as a support for the cover 4 as well as a guide for the push/pull arm 7. The cover 4 is sufficiently strong to carry heavy loads and is screwed, pinned, or otherwise attached to the crown of the enclosure 1, thereby closing off the open top of the enclosure 1 making the enclosure 1 waterproof. The cover 4 includes a single hole with a single watertight door 9, through which the tower 6 and its associated connector portion 20 passes when raised. The door 9 is held securely in the closed position by magnetic force. The magnetic force can be supplied by a magnet (not shown) which can be either a permanent magnet or an electromagnet.

Depending on the type of electrical port on the vehicle, a specific type of tower 6 is selected from the magazine 2 and moved into an alignment position with the door 9. The selected tower 6 extends and retracts slide-ably through the cover 4, pushing the door 9 open as the tower 6 slide-ably moves vertically upward through the hole in the cover 4. The hole is filled by the rising tower 6, thus keeping the enclosure 1 watertight at all times.

A cover boot 5 is provided, made from a flexible, durable material such as high-density polyethylene (HDPE), Teflon, PVC, or other suitable type of flexible material. Compressed air is expelled from the air tank 3 and blown between the cover 4 and the cover boot 5, causing the cover boot 5 to elongate slightly to loosen any ice, mud and other debris that may have accumulated on the cover boot 5. The cover boot 5 has a hole that corresponds to the hole in the cover 4 so that, as the tower 6 rises, it extends through the cover boot 5 as well. The hole in the cover boot 5 also serves as an exhaust port for the air trapped between the cover 4 and the cover boot 5. Air escaping through the hole in the cover boot 5 blasts away any contaminants that may be near the hole away from the rising tower 6.

As further protection for the electrical connector portion 20 of the tower 6 from contaminants, a flexible sheath 8 is provided to cover the connector portion 20. The sheath 8 is caught by the connector portion 20 the tower 6 rises and extends slide-ably up through the cover 4 and the cover boot 5. As the tower 6 rises it pulls the sheath 8 upward several inches above the cover boot 5, at which time the sheath 8 is pulled to its extents for the bottom of the sheath 8 is captured in the exit hole in the cover 4 and the connector pushes through the top of the sheath 8, and the sheath 8 remains tight around the tower 6 as the tower 6 continues to rise toward the electric vehicle that is parked above it.

The tower 6 has at least one sidewall, a top with a manufactured connector portion 20 affixed thereto, and a bottom that includes a female common wire connector. The female common wire connector includes a "quick disconnect" engagement structure at the bottom of the tower 6 which corresponds to a male common wire "quick disconnect" engagement structure that is integrated into the push/pull arm 7, which is turn connected to the electrical power supply (not shown) for imparting an electrical charge to the vehicle. It is to be appreciated that the male and female positions can be reversed without departing from the invention. In this manner, a common wire configuration can be made and unmade at the bottom of the tower 6 to accommodate specific different wire configurations for the various types of manufactured electrical connector portions 20 at the respective tops of each type of tower 6.

The push/pull arm 7 is attached to a threaded rod 14 via a nut 10. The push/pull arm 7 houses the primary power and communication connections for the tower 6 as well as coolant ports for all possible connector portions 20 in use. The push/pull arm 7 moves up and down the threaded rod 14 respectively in response to a clockwise or counterclockwise rotation of the threaded rod 14. As the push/pull arm 7 travels up and down the threaded thread rod 14 it respectively pushes and pulls the tower 6 respectively out of and into the top of the enclosure 1.

The push/pull arm 7 includes permanent magnets that engage and pull down on the tower 6 to disconnect it from the secondary connector 1002 attached to a vehicle. When the tower 6 is fully retracted within the enclosure 1, the push/pull arm 7 disengages the universal wire connector at the bottom of the tower 6, thereby allowing for a different tower 6 to be selected if a different type of connector portion 20 is required for the next vehicle. As the tower 6 is pulled down into the enclosure 1 by the push/pull arm 7 and as the connector that is attached to the top of the tower 6 passes the door 9 and the sheath 8 has been drawn back into the cover 4 and covering the connector, the water tight door 9 closes magnetically into the hole in the cover 4 and the cover boot 5, thereby sealing the enclosure 1.

At the same time as the tower 6 is being drawn down into the enclosure 1, another blast of air is sent from the air tank 3 into the void between the cover 4 and the cover boot 5 which in turn exhausts out through the hole in the cover boot 5. This air blast clears any moisture and debris accumulates around the hole in the cover 4 and cover boot 5, thereby preventing contamination of the connector portion 20 at the top of the tower 6.

When the connector portion 20 contacts the mating connector portion 20 of the vehicle, the tower 6 with the connector portion 20 continues to be pushed into a mating connector portion 30 by the push/pull arm 7 attached to the threaded rod 14 by a nut 10, traveling up and down the threaded rod 14 with a clockwise or counterclockwise rotation of the threaded rod 14. When the connector portion 20 reaches a predetermined force, the threaded rod 14 stops turning as the result of the opening of a limit switch 11 at the top of the threaded rod 14. If the force on the connector portion 20 decreases for any reason, the limit switch 11 at the top of the threaded rod 14 closes again, causing the threaded rod 14 to rotate in the up direction, thereby pushing up the push/pull arm 7 which in turn pushes the tower 6 up, retaining the predetermined force on the connector portion 20.

As mentioned hereinabove, if the force on the connector portion 20 should increase for any reason, the tower 6 presses down on the push/pull arm 7, forcing it down which in turn forces down the threaded rod 14. This closes a limit switch 12 at the bottom of the threaded rod 14, causing the threaded rod 14 to rotate in the down direction, thus relieving the excess force on the connector portion 20. When the excess pressure is relieved, the threaded rod 14 moves upward, opening the limit switch and maintaining the predetermined force.

The force on the connector is set by a spring washer 13 or other pressure sensing device to serve the same purpose at the bottom of the threaded rod 14. When sufficient force is applied to the spring washer 13 by the threaded rod 14, the spring washer 13 allows the threaded rod 14 to move slightly down, opening the limit switch 11 at the top of the threaded rod 14. If additional force is applied to the spring washer 13 by the threaded rod 14, the threaded rod 14 pushes on the limit switch 12 at the bottom of the threaded rod 14, closing the limit switch 12 and making the threaded rod 14 rotate in the up direction, thus maintaining the proper force on the connectors.

The push/pull arm 7 and the threaded rod 14 are components of an electrical drive system in which the rotation of the threaded rod 14 is provided by a motor 16 arrangement including a belt and pulley connected to the threaded rod 14. This rotation may alternatively be made by a gear connection or a direct drive, as would be appreciated by those skilled in the art.

The rotation of the magazine 3 is provided by a second motor 17 cooperating with a respective gear system. The blast of air that blows between the cover 4 and the cover boot 5 is provided by a rotating gate valve on the air tank 3, actuated by a third motor 18. The sequence of events for the operation of the primary connector 1001 of the present plug-in apparatus is simultaneous in nature and therefore may occur in a different order than described here.

Turning now to FIG. 2, a side view is shown of the secondary connector 1002 according to the preferred embodiment including an installed mating connector portion 30 for the vehicle along with various other components shown in various layers. In the preferred embodiment, the secondary connector 1002 includes an enclosure 101 having at least one sidewall an open top, and an open bottom, a substrate 105 including five layers, each shown as individual overhead views below the side view of the secondary connector 1002.

A first layer 107 forms an upper plate of the substrate 105. A second layer 108 defines a cavity for admitting the connector portion 20 and a door operating system including an arrangement of permanent magnets. A third layer 109 includes airtight doors 103 having electromagnets that cooperate with the permanent magnets of the door operator system of the second layer 108 and a pocket that allows the inverted cone 102 and connector portion 20 to move freely within the substrate 105. The airtight doors 103 are opened and closed to protect the interior from moisture and debris and to admit the connector portion 20.

A fourth layer 110 forms a cavity that retains an inverted cone 102. The inverted cone 102 retains and engages the mating connector portion 30 and is capable of movement in order to establish the connection with the connector portion 20 on the tower 6, as will be explained in detail hereinbelow. The inverted cone 102 is funnel-shaped, having a tapered, sloping interior side that engages the connector portion 20 when the associated tower 6 is rising. A fifth layer 111 forms the bottom of the substrate 105 and defines the bottom support for securely retaining the inverted cone 102 in between the layers within the substrate 105.

A mounting flange 104 is located on the external surface of the chassis of a vehicle and forms a sandwich with the chassis structure between the mounting flange 104 and the substrate 105 of the secondary device 1002. The airtight doors 103 are moved and held open, or moved and held closed by respectively by reversing the polarity of the electromagnets of the doors 103, which produce a resulting magnetic influence on the permanent magnets of the door operating system of the second layer 108.

The inverted cone 102 at its top has the receiving connector which is connected to the electrical storage device charging system of the vehicle and serves as an air tank when the doors 103 are closed. When the doors 103 are opened, high pressure air rushes into the opening formed by the fifth layer 111 of the substrate 105 and a finger cover 106 which opens the entry of the mounting flange 104, blowing away any moisture or debris that may have accumulated around the opening. The finger cover 106 includes a plurality of "fingers" that face radially inward from the periphery. The fingers open to admit the tower 6 when raised by providing an additional barrier to prevent intrusion of water and debris into the mouth of the inverted cone. These fingers are opened at the same time as the air is blasted out through the primary doors.

The inverted cone 102 has free movement within the cavity between the third layer 109 and the fifth layer 111. This free movement of the inverted cone 102 permits alignment of the connector portion 20 on the tower 6 coming up from the ground if the connector portion 20 is not in perfect alignment with the secondary connector 1002 installed in the vehicle. The free movement enables connector portion 20 on the tower 6 to encounter the sloped surface of the inverted cone 102, so that the inverted cone 102 slides several inches horizontally in any necessary direction until perfect alignment is achieved between the connector portion 20 and the mating connector portion 30. The inverted cone 102 also has the freedom of movement to rotate several degrees from center to the left and to the right so that the connectors can be correctly "clocked" to one another (where "clocked" refers to the proper, required rotational orientation of the inverted cone), to enable a proper electrical connection to be established.

A more detailed description of the present invention is presented herewith, so that there may be a fuller understanding of the construction and operation of the present plug-in apparatus. Described herein are the preferred techniques and elements of the present invention in the order in which the events may accrue during a normal charging event. A typical charging event of an electric vehicle begins with wireless communication between an electric vehicle and the charging station. The method of communication can be determined by the vehicle manufacturer and or by a management system or network of the charging station.

The driver of an electric vehicle decides a charge is needed and contacts an associated network provider to request the whereabouts of the nearest charging station to the vehicle's present location. Upon receiving the request, the network directs the driver to the nearest station. An autonomous vehicle can drive the vehicle to the station without driver interaction. Simultaneously the network informs the charging station that a specific vehicle will be arriving at a certain time and a specific connector is required for said vehicle. A command is sent simultaneously to the primary connector 1001 and the secondary connector 1002 to prepare for a charging event.

The charging station automatically selects a suitable tower 6 having the required connector portion 20 from the towers 6 retained in the magazine 2 of the primary connector 1001. If the required connector portion 20 is not already in place, the primary connector 1001 is instructed to rotate the magazine 2 so that the tower 6 having the proper connector portion 20 is in position and ready to be plugged in when the vehicle arrives. As the vehicle approaches the charging station, the vehicle confirms the identity of the specific charging station selected by the network for this particular charging event.

Once the specific station is identified and the vehicle is within several feet, the vehicle switches to locator mode so that the secondary apparatus 1002 on the vehicle can sense wireless locators installed in the surface of the parking area which guide the vehicle into the required parking position at the charging station. Upon the vehicle power being turned off, the vehicle simultaneously commands both the secondary connector 1002 and the primary connector 1001 to plug in and engage. The following events take place after the vehicle has given the command to plug in and engage. In one aspect of the invention, these events occur simultaneously, however these events can optionally occur in a different order without departing from the invention.

Figure 3:
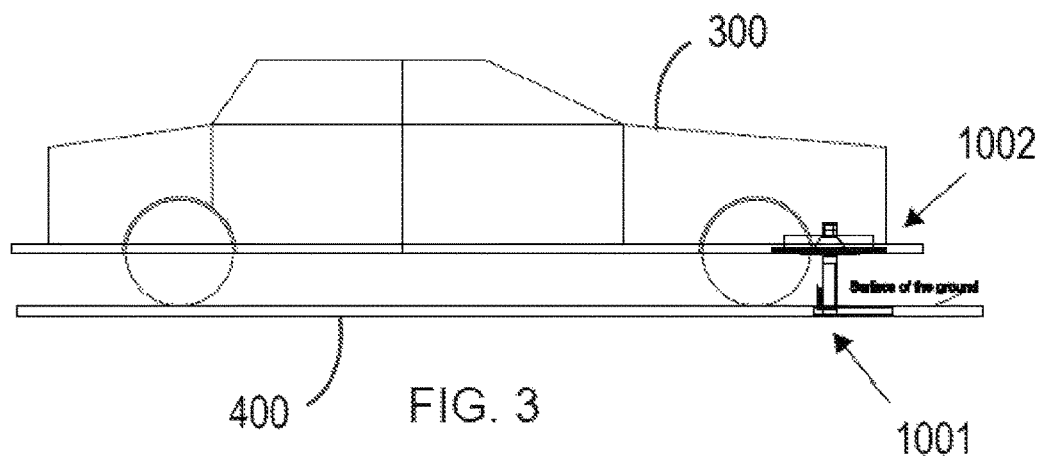
FIG. 3 is a side view depicting the primary connector of the present pop up apparatus installed in the ground engaging with the secondary connector of a vehicle parked above, where the secondary connector is installed in the underside of the vehicle and a tower of the primary connector is partially extended with an electrical connection affixed at its top.

FIG. 3 shows a vehicle 300 parked in a charging station 400 having a primary connector 1001 of the present pop up apparatus installed in the ground and engaging with the secondary connector 1002 of the vehicle 300 parked above. As depicted, the secondary connector 1002 is installed in the underside of the vehicle 300 so that a selected tower 6 of the primary connector 1001 is partially extended with an electrical connection portion 20 affixed at its top.

Upon parking the vehicle 300, compressed air is released from the air tank 3 into the cavity between the cover 4 and the cover boot 5, causing the cover boot 5 to elongate, thus loosening any debris adhering to the boot. As the pressure builds up between the cover 4 and the cover boot 5, the tower 6 begins to move slide-ably upwards in a vertical direction out of the enclosure 1 through the cover 4 and pushes against the door 9. The door 9 opens as the tower 6 rises toward the vehicle 300. As the door 9 opens, air trapped between the cover 4 and cover boot 5 escapes and blows any moisture and debris away from the rising tower 6.

At the same time as the tower 6 is rising, the secondary connector 1002 opens the air tight doors 103 and the finger doors 106. Any air trapped behind the air tight doors 103 is released and blows away any moisture and debris that may have accumulated around the opening of the secondary connector 1002. The tower 6 of the primary connector 1001 continues to move upwards to establish a connection with the secondary connector 1002 when it encounters the inverted cone 102, which may be several inches out of perfect alignment. In this instance, the moving tower 6 engages the sloping sidewall of the inverted cone 102 causing it to slide horizontally so that the connector portion 20 of the tower 6 comes into alignment with the mating connecting portion 30 of the secondary connector 1002.

If the respective connectors portions 20, 30 at this point are not clocked correctly, the secondary connector 1002 is magnetically turned so that it moves into alignment. The clocking movement is caused by the natural attraction and repulsion of permanent magnets on either side of center. There are three magnetic poles on the secondary connector 1002. The outer two poles are minus, and one in the middle is a positive pole. On the primary connector 1001 there is a single negative pole. When these two connectors get into close proximity to one another the repulsive and attractive nature of these magnets will cause the secondary connector to rotate to the proper alignment position.

Upon achieving alignment in all directions and orientations, the connector portion 20 of the primary connector 1001 is pushed into engagement with the mating connector portion 30 of the secondary connector 1002. At this point all communication between the vehicle 300 and the charging station 400 is accomplished through a hard wire connection through the connector portions 20, 30. If external battery cooling or heating fluid is needed for charging the electrical storage device, these connections are also made at this time through suitable ports.

Sufficient force is supplied to the connector portion 20 to maintain a slip free, and leak proof connection. Charging of the electrical storage device from this point to completion or termination is accomplished in the conventional manner for plug-in connections. Upon completion or termination of the charging process, the vehicle 300 informs the charging station 400 that the charge is complete and the connection can be terminated. At this point the tower 6 retracts back down into the enclosure 1 of the primary EVSE 1001 to be ready for the next charging event. The secondary connector 1002 closes the airtight doors 103 and the finger doors 106 so that the driver can drive away.

In one exemplary implementation, the primary connector 1001 is raised to the secondary connector 1002 so that a preset force is applied to the connectors 1001, 1002 sufficient to maintain a proper connection. If the vehicle raises on its suspension, the preset force on the tower 6 is reduced and the system senses the reduction in force and causes the tower 6 to be raised following the vehicle to maintain the connection. Similarly, if the force on the connectors 1001, 1002 is increased because the vehicle moves down on its suspension, the system senses the increase in force and reduces the preset force applied to the tower 6, and moves the tower 6 downward, thereby maintaining the connection.

Figure 4:
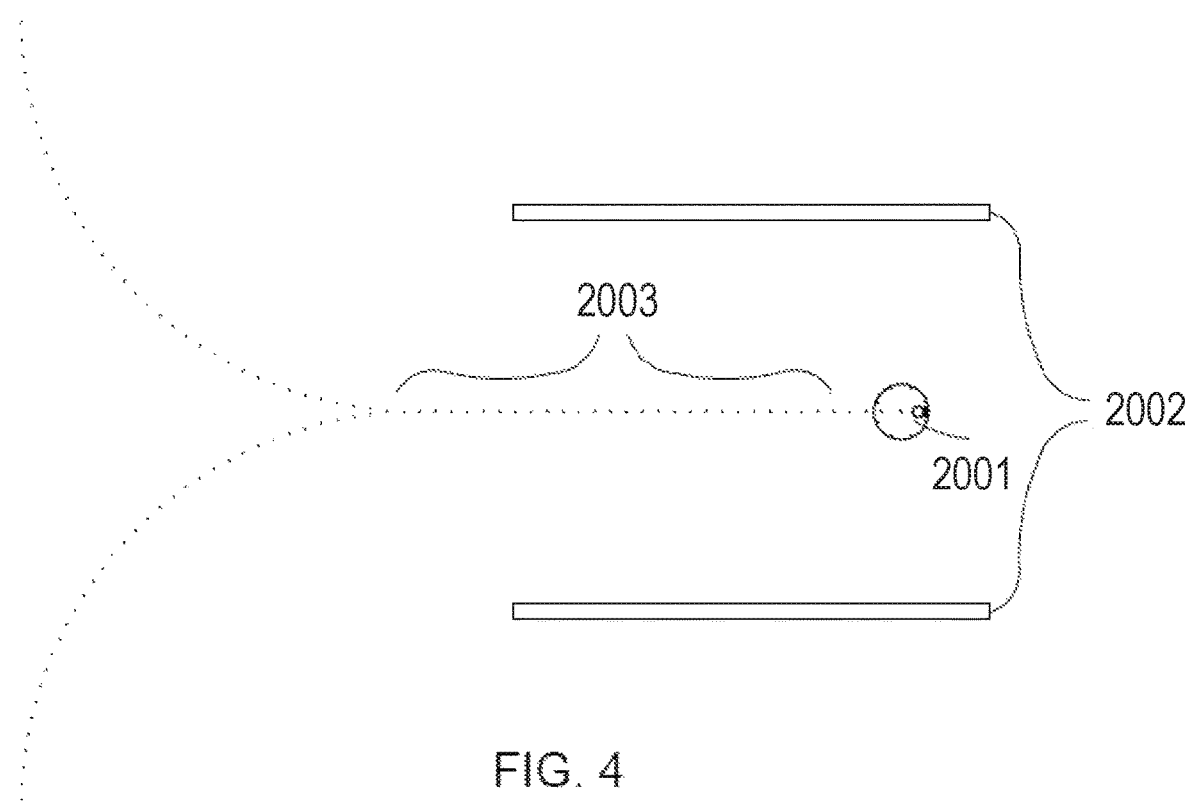
FIG. 4 is a top view looking down on one type of parking surface incorporating precise positioning of a vehicle.

FIG. 4 is an overhead view looking down on a typical straight parking space employing a more precise positioning of a vehicle for used with of the present charging network positioning system. Painted lines 2002 define an individual parking space. Metallic directional markers in the form of dots 2003 direct the vehicle to the charging station. An EVSE 2001 in accordance with the foregoing embodiments is located in the center of the parking space.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A plug-in apparatus for charging an electric vehicle, comprising:
   a primary connector including:

a tower having a connector portion to impart an electric charge to the vehicle, wherein the tower is vertically slide-ably moveable from a stored position underground to a raised position where the connector engages and connects to the underside of the vehicle;

an enclosure retained in a generally horizontal parking surface, situated to be underneath the vehicle when located on the parking surface, wherein the enclosure receives and retains the tower for slide-ably vertical movement between the stored position where the tower is fully enclosed and secured within the enclosure underground and the raised position where the tower engages and connects to the underside of the vehicle;

a cover for securing and sealing the enclosure, the cover comprising a door for selectively opening to admit the tower to the raised position to engage and connect to the underside of the vehicle; and a secondary connector, attached to the underside of the chassis of the vehicle, and including:

an inverted cone having a sloping sidewall for receiving the connector portion when the tower is moving into the raised position;

a substrate for retaining the inverted cone for horizontal free movement, so that the inverted cone can slide horizontally 360 degrees into an alignment position when the tower, in the raised position, encounters the sloping sidewall;

a mating connector portion, affixed at the top of the inverted cone, for electrically connecting and engaging the connector portion of the tower when the inverted cone is in the alignment position, wherein the mating connector portion is connected to charging circuitry of the electric vehicle to receive the electric charge imparted by the connector portion.

2. The plug-in apparatus of claim 1, wherein the enclosure is a waterproof enclosure permanently installed into the parking surface at a charging station, and wherein the enclosure comprises at least one sidewalk a bottom, and an open top having a crown sealed by the cover.

3. The plug-in apparatus of claim 1, wherein the tower is selected from one of a plurality of towers each having respective different types of connector portions, and wherein the enclosure comprises a magazine to hold the plurality of towers, wherein the magazine rotates to index a selected tower into alignment with the door to be vertically slide-ably moveable into the raised position.

4. The plug-in apparatus of claim 1, further comprising a motor cooperating with a system for rotating the magazine.

5. The plug-in apparatus of claim 1, wherein the connector portion at the top of the tower provides at least one of low or high voltage electricity with one of DC or AC current.

6. The plug-in apparatus of claim 1, wherein the substrate further comprises a plurality of layers including a layer with a cavity that retains and allows the horizontal free movement of the inverted cone, wherein the substrate further comprises a top layer that forms an upper plate and a bottom layer that forms the bottom of the substrate to define a bottom support for securely retaining the inverted cone in between the layers within the substrate.

7. The plug-in apparatus of claim 6, wherein the substrate further comprises a layer between the top layer and the bottom layer having two airtight doors to protect against moisture and debris and admit the connector portion.

8. The plug-in apparatus of claim 1, wherein the horizontal free movement of the inverted cone comprises several degrees of rotation from center to clock the secondary connector for alignment with the connector portion of the tower.

9. The plug-in apparatus of claim 1, wherein the enclosure further comprises an air tank for supplying a blast of air to blow away moisture and debris from the cover.

10. The plug-in apparatus of claim 8, wherein the air tank comprises a rotating gate valve that supplies the blast of air and a motor that actuates the rotating gate valve.

11. The plug-in apparatus of claim 1, wherein the tower further comprises at least one sidewall, a top with the connector portion affixed thereto, and a bottom that includes a common wire connector.

12. The plug-in apparatus of claim 11, further comprising a drive system for slide-ably vertically moving the tower from the stored position to the raised position.

13. The plug-in apparatus of claim 12, wherein the drive system comprises a push/pull arm that supports the tower for raising and lowering.

14. The plug-in apparatus of claim 13, wherein the drive system further comprises a threaded rod attached to the push/pull arm via a nut, such that the push/pull arm moves up and down the threaded rod respectively in response to a clockwise or counterclockwise rotation of the threaded rod, which respectively pushes and pulls the tower respectively out of and into the top of the enclosure.

15. The plug-in apparatus of claim 14, wherein the drive system further comprises a motor arrangement for rotating the threaded rod.

16. The plug-in apparatus of claim 13, wherein the push/pull arm includes a mating common wire connector for electrically connecting an electrical power supply to the common wire connector on the bottom of the tower for imparting the electrical charge to the vehicle, wherein one of the common wire connector or the mating common wire connector is a male electrical connector and the respective other is a female electrical connector.

17. The plug-in apparatus of claim 13, wherein the push/pull arm houses primary power and communication connections for the tower and coolant ports for different types of connector portions.

18. The plug-in apparatus of claim 1, wherein the primary connector is raised to the secondary connector so that a preset force is applied to the tower sufficient to maintain a proper connection between the connectors.

19. The plug-in apparatus of claim 18, wherein should the vehicle raise on its suspension for any reason the tower will follow the vehicle, maintaining the preset force necessary for a secure connection.

20. The plug-in apparatus of claim 18, wherein should the vehicle move down on its suspension for any reason the tower will follow the vehicle down maintaining the preset force necessary for a secure connection.

* * * * *